United States Patent [19]

Thonnart

[11] 4,413,281
[45] Nov. 1, 1983

[54] METHOD FOR SIMULTANEOUS TELETEXT AND ANALOG SIGNAL TRANSMISSION

[75] Inventor: Paul Thonnart, Liege, Belgium

[73] Assignee: Ateliers de Constructions Electriques de Charleroi, Brussels, Belgium

[21] Appl. No.: 277,672

[22] Filed: Jun. 26, 1981

[30] Foreign Application Priority Data

Jul. 1, 1980 [EP] European Pat. Off. ............ 80200623

[51] Int. Cl.³ ............................................. H04N 7/08
[52] U.S. Cl. ................................... 358/147; 358/146
[58] Field of Search ............... 358/147, 142, 143, 146, 358/114, 86

[56] References Cited

U.S. PATENT DOCUMENTS

3,746,780  7/1973  Stetten et al. ...................... 358/142
3,859,458  1/1975  Takezawa et al. .................. 358/143
3,982,065  9/1976  Barnaby et al. ..................... 358/147

OTHER PUBLICATIONS

Darrington, "Wireless World Teletext Decoder", *Wireless World*, vol. 81, No. 1479, pp. 498–504, Nov. 1975.

*Primary Examiner*—John C. Martin
*Attorney, Agent, or Firm*—Schwartz, Jeffery, Schwaab, Mack, Blumenthal & Koch

[57] ABSTRACT

Disclosed is a process for the transmission of information over television networks wherein certain information is encoded in digital form and transmitted by supplementing and/or replacing the information forming the conventional program. The digital information is received by a conventional receiving set equipped with a decoding, memory and detector means. Information is transmitted in the form of analog signals subdivided into scans or groups of scans, each scan having associated identifying material. The information transmitted in digital form has other identifying material and is transmitted generally synchronously with the corresponding information in analog form. The transmissions are received by receivers with detectors sensitive to the identifying material and which have analog-digital and inverse conversion means as well as memory and decoding means to reproduce the information contained in the analog and digital signals.

7 Claims, 5 Drawing Figures

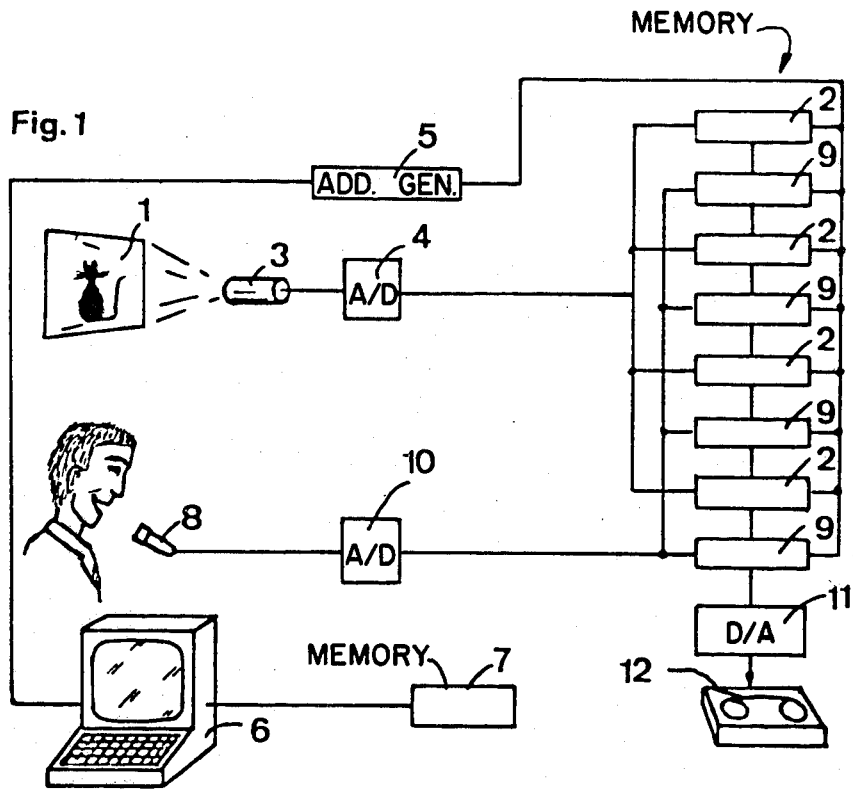
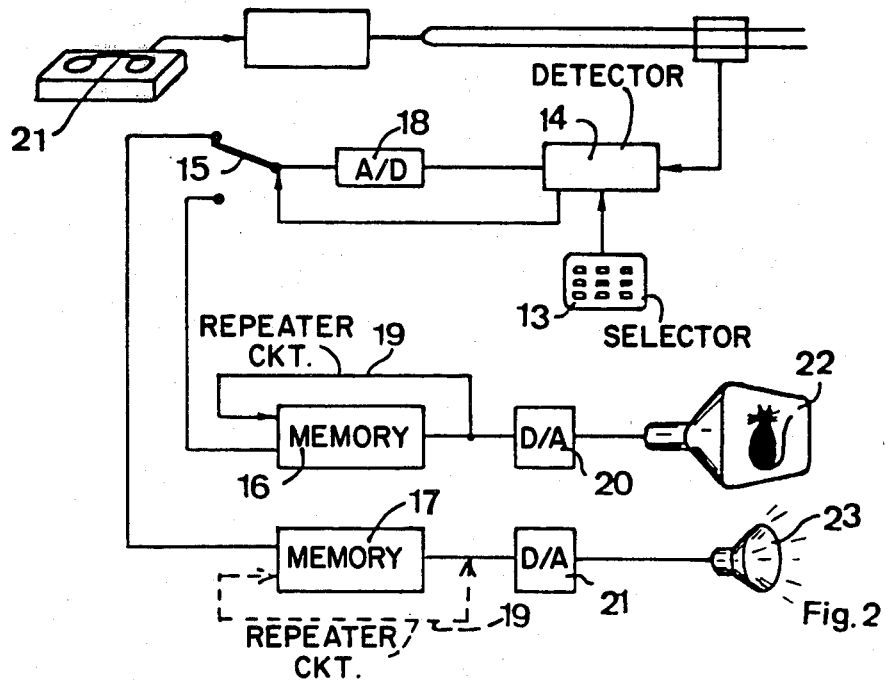

METHOD FOR SIMULTANEOUS TELETEXT AND ANALOG SIGNAL TRANSMISSION

FIELD OF THE INVENTION

This invention relates to the transmission of information coded in a digital form.

BACKGROUND OF THE INVENTION

It has been known to use television networks to transmit, either for supplementing or replacing the images and sounds composing the usual programs, texts and sequences coded in a digital form (designed hereinafter as teletexts) and to permit their reproduction by the user, on an ordinary receiving station by means of a decoding and memory apparatus equipped with a "page" selector. The expression "page" is used to designate the entirety of the information appearing simultaneously on the screen of the receiving station. The transmission of this information in the form of texts and sequences comprising one or several (generally less than one thousand) scans, is repeated in a cyclic manner. This system utilizes, for the transmission of information coded at two levels in a numerical form, television rasters intended for the transmission of analog signals. The analog signals are usually transmitted at approximately one hundred different levels at each instance and require a signal/noise of on the order of 50 dB. The transmission of information coded in the digital form does not exploit this excellent ratio since a signal/noise ratio of 15 dB is sufficient.

SUMMARY OF THE INVENTION

It is therefore an object of the invention to exploit the excellent transmission quality of television networks for the transmission of messages wherein the texts transmitted in digital form are accompanied by messages in analog form representing stationary images or short commentaries.

To achieve the foregoing and other objects in accordance with the purpose of the present invention as embodied and broadly described herein, the invention may comprise transmitting the contents of information, represented by analog signals subdivided into scans or groups of several scans. Each scan of the same group repeats the same content and each scan is of a duration equal to that necessary for the transmission of a scan of a television image. Preferably, an identifying message is associated with each scan or each group of scans so that teletexts, indexed by other identifying messages, are transmitted in a digital form in a manner at least approximately synchronous with the corresponding information in the analog form. It is also preferred that the receiving television stations of the users be equipped with selectors sensitive to identifying messages. It is a further aspect of the invention that the selectors cooperate with a analog-digital conversion means and inversely with a memory, decoding and repeated reproduction means associated with the digital and analog signals received.

Additional objects, advantages and novel features of the invention will be set forth in part in the description which follows, and in part will become apparent to those skilled in the art upon examination of the following or may be learned by practice of the invention. The objects and advantages of the invention may be realilzed and attained by means of the instrumentalities and combinations particularly pointed out in the appended claims.

BRIEF DESCRIPTION OF THE DRAWINGS

The accompanying drawings, which are incorporated in and form a part of the specification illustrate various embodiments of the present invention and, together with the description, serve to explain the principals of the invention. In the drawings:

FIG. 1 is a schematic illustration of an image and information transmitter according to the present invention;

FIG. 2 is a schematic illustration of an image and information receiver according to the present invention;

DETAILED DESCRIPTION OF THE DRAWINGS

Figure 3:
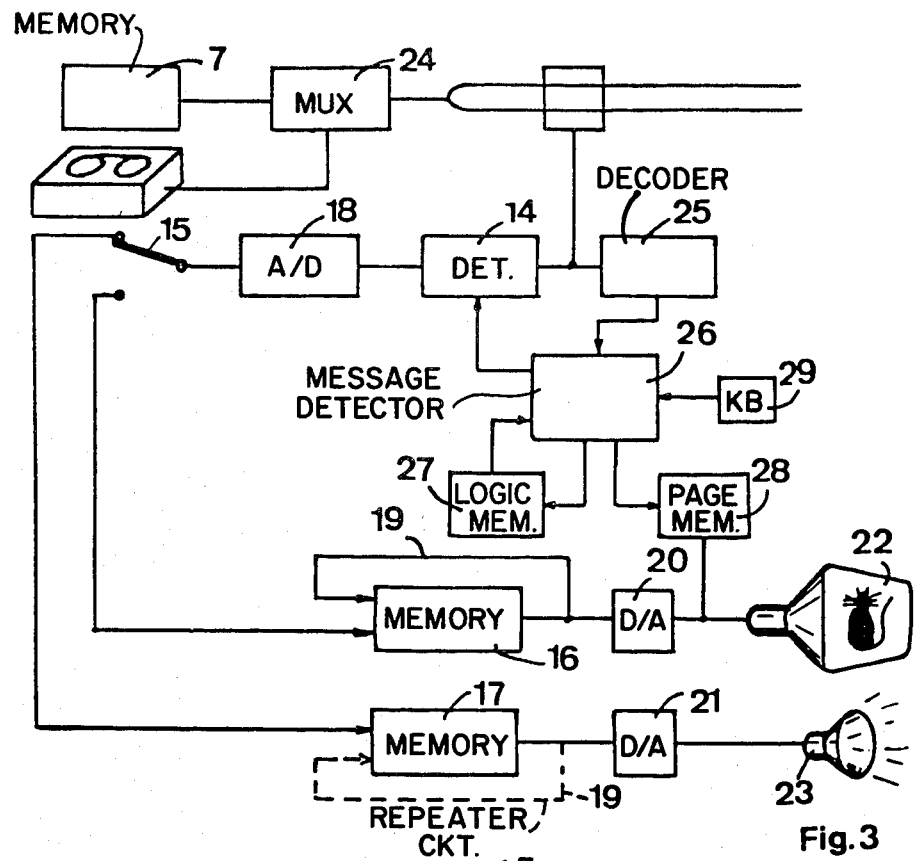
FIG. 3 is a schematic illustration of another embodiment of an image and information receiving.

Turning first to FIG. 1, at the point of emission, an image 1 is recorded in a memory 2 or an assembly of memories 2 by means of a scanning tube 3 and analog-digital transformer 4. The recording in the memory or memories 2 is completed by an identifying message, for example an address number emitted by a generator 5 of identifying messages, which may be connected with a composition device 6, represented in the form of a keyboard combined with a control screen. The composition device 6 may coincide with the device used for the composition of the teletext, which, as explained hereinabove, may comprise parts of a text and/or of diagrams. The text and the diagrams composed in the device 6 are passed in the form of digitally coded information into a memory 7, which may also record a logic sequence serving to control the successive reproduction of a text, images and voice commentaries at the point of reception, for example within the framework of a relatively complex educational program wherein the succession depends on the progress of the student and may include repetitions. The memory 7 may consist for example of a conventional diskette.

Concerning the transmission of images, it is possible specifically to describe each image to be transmitted in only a single scan, i.e. in 312.5 lines. However, in order to utilize the existing equipment of television for the transmission of images, it is frequently more advantageous to use a process wherein each image is repeated in a plurality of scans in succession (for example, four).

To mount a band under these conditions, it is necessary to prepare four scans or frames prior to recording on a tape recorder.

Potentially, a commentary spoken prior to or during the appearance of the image or the teletext is received by a microphone 8 and transmitted to a memory 9 or a plurality of memories 9 by means of an anolog-digital transformer 10. The recording in the memory or memories 9 is also completed by an indentifying message emitted by the generator 5.

The contents of the memories 2 and 9 are subsequently complemented by supplemental information such as synchronizing pulses, etc., originating in a suitable generator, which in certain cases may be incorporated in the generator 5.

The "image" and "sound" contents proper of the memories 2 and 9 are subsequently retransformed into analog signals in a digital-analog transformer 11 to reconstitute the analog signals to be recorded on a studio tape recorder tape 12.

During the reconstitution of the analog signals, the frequencies of the audio signal may be multiplied for example by a factor of 1000 so as to transmit by means of one scan with a duration of 0.02 sec, an audio message with a duration for example of 20 sec.

In addition to or in place of a compression in time, the commentary may be compressed in another manner for example by means of a Hadamard transformation, a reconstitution of an analog signal of the Hadamard transform. This complication of the signal treatment renders a greater compression of the audio commentary part possible.

The information recorded on the studio magnetic tape recorder 12 and in the memory or diskette 7, is transmitted, for example, on a normal transmission channel during "empty" moments when the television transmitter does not broadcast programs or during the few seconds between two successive programs. The information will be received with an acceptable time delay of, for example, a few seconds, or, preferably, on one or more normal channels reserved for the transmission of teletext information with images and/or audio commentary at all hours of the day. In particular, one of these reserved channels may transmit the digitally coded information of the memory 7 and another channel the essentially analog information recorded in the tape recorder 12. In the case of a transmission over a single normal emitting channel, the empty hours are preferably reserved for the transmission of scholarly programs or the like, the particular identification whereof permits the activation of a magnetic tape recorder at the location of the users of this type of programming.

During reception, the "image" and "sound" information may be recorded initially on the tape of a video-cassette, or, according to FIG. 2, they may be made the direct object of selection through a suitable decoder, comprising at least one selector 13 acting on a detector 14 of identifying messages. The latter detects the "image" and the "sound" parts of the message selected and transmits them by means of a switch 15, which it actuates, to either the digital memory 16 for the image or the memory 17 for the sound, after passing the message through an analog-digital transformer 18.

The device for the reproduction of the information contained in the memories 16 and 17 consists of the repeating circuits 19 and the appropriate digital-analog transformers 20 for the image or 21 for the sound. The transformers 20 and 21 supply the image tube 22, or, following the reconstitution of the original audio signal, the speaker 23 of the receiving set of the user respectively.

The transmission of the entirety of the information may be accomplished over a single channel by means of the equipment according to FIG. 3. The emission of the information recorded in the memory 7, for example on diskettes, is effected through a multiplexer 24, together with the information coming from the tape recorder 12. The composite output signal of the multiplexer 24 thus comprises a mixture of signals coded in the digital form and of analog signals. The information in the digital form is transmitted during predetermined times and taken from the scans of the information in the analog form during nonsignificant periods; specifically, the lines 10 to 18 and 323 to 335 of a pair of scans relative to one or two stationary images may be used. Preferably, the transmission of the teletext relative to one image is effected in synchronism with that image. However, in case of an imbalance between the digital and analog types of information, the synchronism may be sacrificed in favor of the simultaneous transmission of an appropriate logic command. This would optimize, at any moment, the amount of information as a function of the transmission capacity of the channel allocated. The mixture of digital and analog information is collected at the site of the different receivers.

In a receiver, the signal received is passed simultaneously on the one hand into a teletext decoder 25 and on the other, to the detector 14 of identifying messages. The output signals of decoder 25 and detector 14 are treated in the same manner as in the system of FIG. 2. If, in contrast, different channels are assigned to the transmission of the teletext of the digital part of the analog signals, the detector 14 is connected with a device (tuner) to receive information on one of these channels and the decoder 25 of teletext with a device (tuner) to receive information on the other channel.

In this case again, synchronization between the teletext and the information in the analog form represents the ideal case, but for the same reasons as in the case of a single channel, a command logic allows certain deviations from this ideal synchronism in view of the optimization of the quantity of information of each type to be transmitted with the transmission capacity of all of the channels allocated.

The decoder of the teletext, or more accurately, of the information transmitted in the numerical form, is connected with a detector 26. The detector separates the teletext from the information concerning the logic of the exploitation of the entirety of the image, i.e., the teletext and audio commentary, during reception. The latter are sent to a memory 27 and a selected page of the teletext to a memory 28. The contents of the memory 28 may then be displayed on the screen 22. The selection of a page of the teletext is effected in the message detector 26, for example as a function of a program recorded in the memory 27. This selection is effected generally within a very short delay, between a fraction of a second and several seconds, i.e., the time of repetition of the information imposed, for example, at the transmission.

It is also possible to select pages of the teletext and/or images and/or audio commentaries, by means of a keyboard 29, which is for example in the form of an alphanumerical keyboard. By means of this keyboard 29, the orders pass through the detector 26 to eventually reach the detector 14. It is possible to call up at any given moment a predetermined page of the teletext, an image or more specifically a slide and/or an audio commentary illustrating the teletext of a part of a text or a diagram appearing on the screen 22.

Figure 4:
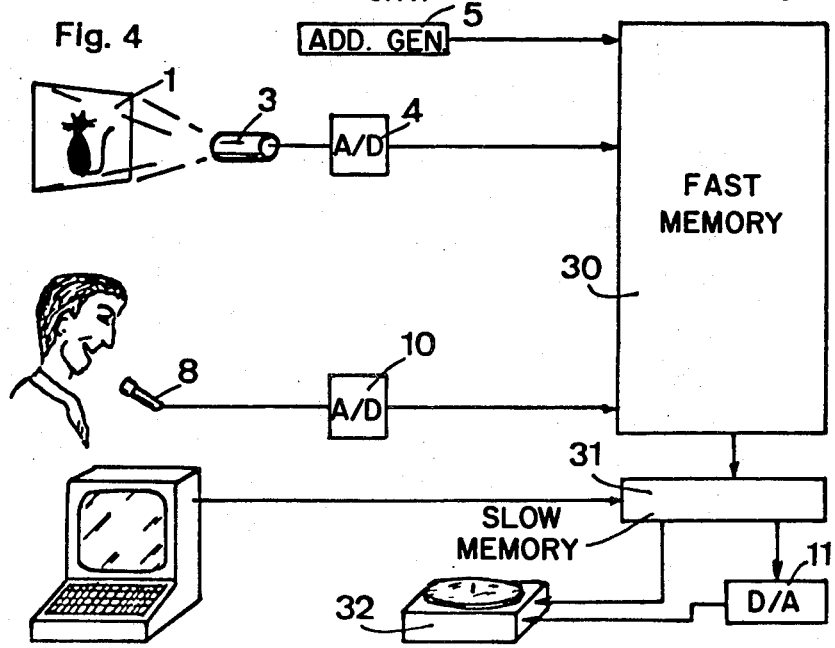
FIG. 4 is a schematic illustration of another embodiment of the image and information transmitter.

FIG. 4 represents an alternative embodiment for the constitution of the support of the information to be transmitted, represented in FIG. 1 by the assembly consisting of a video-cassette 12 and a diskette 7. According to FIG. 4 the assembly of the memories 2 and 9 is replaced by an electronic memory 30 of a size of approximately 4 Mbits, which effects a periodic transfer to a slower memory 31, of a size of 1000 Mbits, replacing in part the memory 7 of FIG. 1. The contents of the memory 31 are then transferred to a high quality support, for example a video-disk 32, by passing, at least in part, through a digital-analog converter 11. During transmission, the video-disk is read by means of a laser beam which assures the virtual absence of wear, this being particularly important, since the information is transmitted in a repetitive manner.

The examples according to FIGS. 3 and 4 described hereinabove belong to the "diffuse" mode of operation, wherein it is not possible, from the receiving station, to affect the program broadcast at the site of the transmitter.

Figure 5:
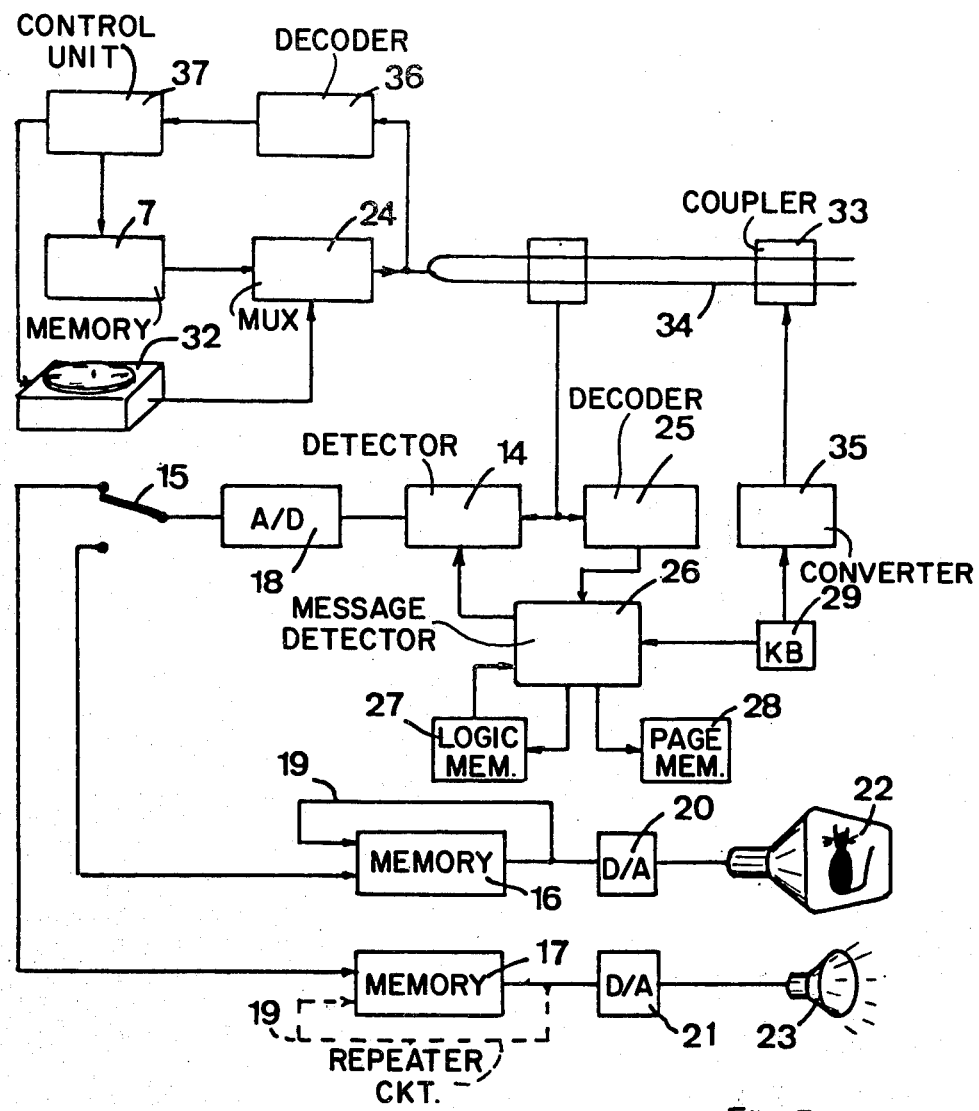
FIG. 5 is a schematic illustration of the "interactive" embodiment of the present invention.

FIG. 5 is an example of the layout of the transmission part operating in the "interactive" mode. A large portion of FIG. 5 is identical with FIG. 3 and the description of that figure will not be repeated here. A bidirectional coupler 33 makes it possible to send on a teledistribution cable 34 a message that is being composed by an operator on the keyboard 29. The message is treated by a converter 35 prior to its transmission. The function of the converter 35 is to place the message in the form of an adequate standard unit, to add to it the code of the receiving station, and to insert the message on the teledistribution cable 34 during a "silent" period between the receiver and the transmitter. Following its reception at the site of the transmitter specifically at the decoder 36, the message is transmitted to a control unit 37 capable of effecting the selection of particular information on the diskette 7 and the video-disk 32, thereby modifying, at the request of the user, the contents of the transmission. The replacement of the cassette 12 of FIG. 3 by a disk 32 is necessary, inasmuch as the selection of particular information from a cassette 12, would not afford a sufficiently rapid selection of a predetermined item of information.

The foregoing description of the preferred embodiments of the invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A process for the transmission of information over television networks comprising:
    (a) generating analog signals representing groups of scans of an image, each of said scans having a duration approximately equal to the time necessary to transmit one scan of a television image;
    (b) generating first identifying messages and combining them with the analog signals representing said scans;
    (c) generating teletext signals in digital form, said teletext signals being associated with said groups of scans;
    (d) generating second identifying messages and combining them with said teletext signals;
    (e) selecting analog signals identified by said first identifying messages and associated teletext signals identified by said second identifying messages and transmitting both approximately at the same time;
    (f) receiving said analog and teletext signals with a receiver responsive to said first and second identifying messages;
    (g) decoding said analog and associated teletext signals; and
    (h) reproducing said decoded analog and associated teletext signals for one of simultaneous or successive reproduction.

2. The process of claim 1, wherein said teletext signals are transmitted over different channels from the analog signals.

3. The process of claim 1, wherein the teletext and analog signals are transmitted over the same transmission channel, the teletext signals being transmitted during predetermined periods of time on said scans of the analog signals.

4. The process of claim 3, wherein the predetermined periods of time are periods where no analog signals are being transmitted.

5. The process of claim 1 or 2 or 3, wherein at least some of said analog signals are video signals.

6. The process of claim 1 or 2 or 3, wherein at least some of said analog signals are audio signals.

7. The process of claim 1 or 2 or 3 or 4, wherein the step of receiving further includes separating said analog and teletext signals, detecting by means of a message detector and logic information contained in said analog and teletext signals and recording said information in a memory.

* * * * *